United States Patent Office 2,997,457
Patented Aug. 22, 1961

2,997,457
SULFONE-CONTAINING ORGANOPOLY-
SILOXANES
Simon W. Kantor, Schenectady, N.Y., assignor to General
Electric Company, a corporation of New York
No Drawing. Filed May 13, 1958, Ser. No. 734,856
14 Claims. (Cl. 260—46.5)

This invention relates to a new class of organopolysiloxanes which are convertible to the solid, cured elastic state and to the cured products resulting from said compositions.

The need for an elastomeric material which will withstand exposure to temperatures of the order of 200° C. or higher for extended periods of time has long been recognized. This need has resulted in silicone rubbers which are elastomeric materials containing a "backbone" of alternate silicon and oxygen atoms and which conventionally contain silicon-bonded hydrocarbon radicals such as methyl or phenyl radicals for satisfying the valences of silicon. Typically, these silicone rubers comprise recurring dimethylsiloxane, methylphenylsiloxane, or diphenylsiloxane units. Although these materials are eminently satisfactory for high temperature applications, including applications in which the silicone rubber comes into contact with polar solvents, the conventional silicone rubbers are not satisfactory for use in applications where they come into contact with non-polar solvents, such as, for example, aviation gasoline. This lack of resistance to non-polar solvents has limited the uses of silicone rubbers in applications such as gasket materials for aircraft fuel lines where the elastomer necessarily comes into contact with hydrocarbon solvents. The effect of these non-polar solvents on the silicone rubber is to cause a swelling of the silicone rubber which ultimately leads to complete loss of strength of the rubber and thus failure of the gasket.

It is an object of the present invention to provide a new silicone elastomer which is resistant to swelling by non-polar solvents.

It is a further object of this invention to provide a new silicone elastomer which exhibits the usual high temperature properties of silicone rubber while being resistant to the deteriorating effects of contact with non-polar solvents.

These and other objects of my invention are accomplished by providing a composition convertible to the solid, cured elastic state comprising an organopolysiloxane in which at least some of the organo groups are silicon-bonded.

(1)

radicals, where R is an alkylene radical containing at least two carbon atoms with the sulfur atom being separated from the silicon atom by at least two carbon atoms, and R' is a member selected from the class consisting of alkyl and aryl radicals, any remaining organo groups of said organopolysiloxane being selected from the class consisting of monovalent hydrocarbon radicals and halogenated monovalent hydrocarbon radicals.

As is seen from Formula 1, the convertible organopolysiloxanes of the present invention differ from prior art materials in the presence of the silicon-bonded sulfone radical. For convenience in describing the organopolysiloxanes of the present invention, they will be referred to sometimes hereinafter as "sulfone-containing organopolysiloxanes." In Formula 1 above the alkylene radical R is preferably a lower alkylene radical such as ethylene, propylene, butylene, hexylene, and octylene radicals. In Formula 1, the alkyl or aryl radical represented by R' is preferably methyl or phenyl, but may be other alkyl or aryl radicals, such as, for example, methyl, ethyl, propyl, octyl, dodecyl, octadecyl, phenyl, naphthyl, tolyl, ethylphenyl, etc. radicals.

The convertible sulfone-containing organopolysiloxanes of the present invention are preferably those having the average formula (2)
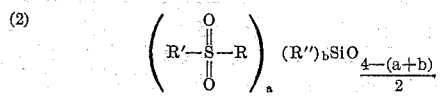

where R and R' are as previously defined and R" represents members selected from the class consisting of monovalent hydrocarbon radicals and halogenated monovalent hydrocarbon radicals and $a$ has a value of from 0.1 to 2.0, inclusive, and the sum of $a+b$ is equal to from 1.9 to 2.1 and preferably is equal to 2. Among the radicals represented by R" are alkyl radicals, e.g., methyl, ethyl, propyl, octyl, etc. radicals; cycloalkyl radicals, e.g., cyclohexyl, cycloheptyl, etc. radicals; aryl radicals, e.g., phenyl, naphthyl, biphenyl, tolyl, xylyl, ethylphenyl, etc. radicals; aralkyl radicals, e.g., benzyl, phenylethyl, etc. radicals; olefinically unsaturated radicals, e.g., vinyl, allyl, cyclohexenyl, styryl, etc. radicals; halogenated monovalent hydrocarbon radicals, e.g., chloromethyl, β-chloropropyl, chlorophenyl, dibromophenyl, etc. radicals. In the preferred embodiment of my invention, R is ethylene, R' is methyl or phenyl, and the R" radicals are methyl.

Sulfone-containing organopolysiloxanes within the scope of the present invention include those containing the recurring unit (3)

alone or intercondensed with recurring units of the formula (4)

In Formulas 3 and 4, R, R' and R" are as previously defined and R''' represents members selected from the class consisting of alkyl radicals, e.g., methyl, ethyl, propyl, butyl, octyl, etc. radicals; and aryl radicals, e.g., phenyl, biphenyl, naphthyl, etc. radicals.

Other sulfone-containing organopolysiloxanes within the scope of the present invention include those containing the recurring unit (5)
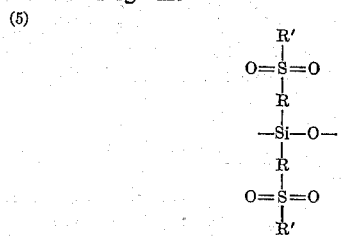

alone or intercondensed with siloxane units of Formula 4 above.

The sulfone-containing organopolysiloxanes of the present invention can be prepared by first forming a hydrolyzable organosilane containing at least one silicon-bonded thioether radical of the formula (6) 

Preferably these hydrolyzable thioether-containing silanes are of the formula (7) 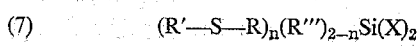

where $n$ is an integer equal to from 1 to 2, inclusive, and X is a hydrolyzable member selected from the class consisting of alkoxy radicals, e.g., methoxy, ethoxy, butoxy, etc. radicals; acyloxy radicals, e.g., acetoxy, propionoxy, etc. radicals; halogen atoms, e.g., fluorine, chlorine, bromine, etc. radicals.

The hydrolyzable silyl thioethers of Formula 7 are hydrolyzed alone or with other hydrolyzable silanes in water or aqueous acid solution to form a low molecular weight cyclic oil or linear oil which may be chain-stopped with hydroxy groups. Where the hydrolyzable silyl-containing thioether of Formula 7 is hydrolyzed with another hydrolyzable silane, silanes within the scope of Formula 8 may be employed.

(8) $\qquad (R'')_2Si(X)_2$ where $R''$ and X are of the scope previously defined. In addition to using the difunctional hydrolyzable silanes of Formulas 7 and 8 in the hydrolysis, it should be understood that minor amounts of monofunctional or trifunctional hydrolyzable silanes may be employed in the hydrolysis so long as the hydrolysis product results in a total ratio of organo groups to silicon atoms of from about 1.9 to 2.1. The concentration or nature of the solution employed in the hydrolysis of the hydrolyzable silanes to the resulting oils is not critical. The only requirement is that there be sufficient water present to hydrolyze all of the silicon-bonded hydrolyzable groups. Generally we employ a two to ten-fold volume excess of the water during hydrolysis. When the hydrolyzable groups on the silanes are halogen, e.g., chlorine, ice water is generally used for the hydrolysis to keep the temperature of the reaction mixture from increasing too much. When the hydrolyzable groups are alkoxy or acyloxy an aqueous acid such as 1 N HCl is used for the hydrolysis and the hydrolysis is effected at a temperature of from 40 to 90° C.

The R'—S—R— radicals in the resulting oils are then oxidized to the corresponding sulfone groups by a two-stage process involving a mild oxidizing agent. One very suitable oxidizing agent has been found to be a mixture of hydrogen peroxide in glacial acetic acid. Again the concentration of the hydrogen peroxide in the glacial acetic acid is not critical, satisfactory results having been obtained with a number of different concentrations including a solution containing 4 parts of glacial acetic acid and 1 part of a 90 percent hydrogen peroxide solution in water. Sufficient hydrogen peroxide is used in two steps to provide sufficient oxygen for the complete oxidation of the thioether radical of Formula 6 to the sulfone radical of Formula 1. Specifically, 2 moles of hydrogen peroxide are required for the complete oxidation. During the first phase of the oxidation, 1 mole of hydrogen peroxide in glacial acetic acid is slowly added to the oil per mole of thioether radicals within the scope of Formula 6. In this first stage an exothermic reaction occurs which converts the thioether to a sulfoxide radical having the formula (9)
$$R'-\overset{O}{\underset{\|}{S}}-R-$$

During this phase of the reaction, the reaction mixture is cooled to maintain its temperature between about 5 and 30° C. To complete the oxidation of the sulfoxide group of Formula 9 to the sulfone group of Formula 1, the remainder of the hydrogen peroxide-acetic acid solution is added and the reaction mixture is heated to a temperature of about 90 to 114° C. At the end of about one hour the oxidation reaction is completed and the reaction product is then mixed with a large excess of water from which an oil phase separates. This oil phase is then separated and cleaned by dissolving it in chloroform, washing with water, drying and removing the solvent by evaporation to yield a pure oil. This oil is then further polymerized to a gum by mixing a basic catalyst such as cesium hydroxide, potassium hydroxide, rubidium hydroxide or tetramethyl ammonium hydroxide therein and heating at a temperature of about 70–150° C. for from 10 to 90 minutes. The amount of basic catalyst employed in the polymerization of the oil to the gum is not critical and may vary from about 0.01 to 1 part by weight per part of oil.

This sulfone-containing organopolysiloxane gum can then be handled in the same manner as conventional silicone gums. Thus, these gums can be cured to the solid, elastic state by incorporating a cross-linking catalyst such as one of the free radical polymerization initiators including, benzoyl peroxide, di-t-butyl peroxide, di-α-cumyl peroxide, α,α'-azodiisobutyronitrile, etc. In general, these peroxide curing catalysts are employed in an amount equal to from about 1 to 5 percent, by weight, based on the weight of the silicone gum. In addition heat alone can be used to cure the gum. As is the case with conventional silicone rubbers, the sulfone-containing silicone rubber of the present invention is particularly useful when it contains a filler. Among the fillers which can be employed in the elastomers of the present invention may be mentioned, for example, silica aerogels, fume silicas, clay, hydrated calcium silicate, zinc sulfide, barium titanate, iron oxide, lithopone, zinc oxide, titania, magnesia, micronized graphite, micronized slate, micronized mica, crushed quartz, diatomaceous earth, lead oxides, alumina and hydrated alumina. Where a filler is employed, it is usually employed in an amount equal to from about 20 to 80 parts by weight of filler per 100 parts of silicone gum.

The hydrolyzable silyl-containing thioethers of Formulas 6 and 7 which are employed as starting materials in the preparation of the sulfone-containing organopolysiloxanes of the present invention can be prepared by the addition of a mercaptan across the double bond of a hydrolyzable silane containing a silicon-bonded alkenyl radical. In particular, the hydrolyzable silyl thioethers can be formed by adding a mercaptan having the formula

(10) $\qquad R'SH$ where R' is as previously defined, to a silicon compound containing at least one silicon-bonded hydrolyzable group and at least one silicon-bonded alkenyl radical. This addition is best effected in the presence of a suitable catalyst. One method of forming these hydrolyzable silyl thioethers is disclosed in the application of Maurice Prober, Serial No. 401,703, filed December 31, 1953, and assigned to the same assignee as the present invention. The method of this aforementioned Prober application comprises reacting a mercaptan with a hydrolyzable vinyl silane in the presence of a suitable basic catalyst such as a sodium mercaptide. Another method of forming the hydrolyzable silyl thioethers is disclosed in the copending application of Maurice Prober, Serial No. 734,815, filed concurrently herewith and assigned to the same assignee as the present invention. By the method of this last-mentioned application, a mercaptan is added to a hydrolyzable vinyl silane in the presence of ultraviolet light, an organic peroxide or other free radical initiator. This last-mentioned Prober application discloses a large number of hydrolyzable silyl thioethers which may be employed as starting materials in the preparation of the sulfone-containing organopolysiloxanes of the present invention.

One particularly useful class of hydrolyzable silyl thioethers useful as starting materials in the present invention are those formed by adding a mercaptan within the scope of Formula 10 to a hydrolyzable alkenyl silane having the formula

(11) $\qquad (\text{alkenyl})_n(R''')_{2-n}Si(X)_2$ where $n$ and X are as previously defined, R''' is as previously defined, and the alkenyl radical includes vinyl, allyl, methallyl, 2-butenyl, and other lower alkenyl radicals such as alkenyl radicals containing from 2 to 7 carbon atoms. The hydrolyzable group in the silane of Formula 11 is identical in scope with the hydrolyzable radicals previously described in connection with the hydrolyzable silyl thioether of Formula 7.

The following examples are illustrative of the practice of my invention and are not intended for purposes of limitation.

Example 1

Equimolar amounts of phenyl mercaptan and methylvinyl dichlorosilane were mixed and irradiated with ultra-violet light for 2 hours during which time the temperature of the reaction mixture rose from room temperature to about 75° C. At the end of this time the reaction mixture was fractionally distilled to give a 67 percent yield of 2(methyldichlorosilyl)-ethyl phenyl thioether having the formula $$(CH_3)(C_6H_5SCH_2CH_2)SiCl_2$$

This material had a boiling point of 140.5 to 143° C. at 4 mm. and contained 43.7 percent carbon, 4.9 percent hydrogen, 11.0 percent silicon and 12.6 percent sulfur as compared with the theoretical values of 43.1 percent carbon, 4.8 percent hydrogen, 11.2 percent silicon and 12.8 percent sulfur.

About 100 grams of the thioether just described were added to 500 grams of ice water over a period of 1½ hours. This resulted in a two-phase system with oil as the lower phase. After neutralization of this two-phase system with 10 percent sodium hydroxide, the oil layer was separated and extracted with ether. This extract was washed in sodium hydroxide and water and dried over potassium carbonate and by vacuum at 200° C. and 1 mm. This resulted in a 95 percent yield of a sulfur-containing organopolysiloxane consisting essentially of the following recurring structural unit:

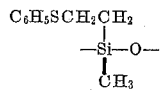

Chemical analysis of this material showed the presence of 54.5 percent carbon, 6.4 percent hydrogen, 14.4 percent silicon, and 16.2 percent sulfur as compared with the theoretical values of 55.1 percent carbon, 6.2 percent hydrogen, 14.3 percent silicon and 16.3 percent sulfur. Infrared analysis of this oil was consistent with the above structure.

A solution was made of 39.2 grams of the oil just described and 40 grams of glacial acetic acid. A second solution was made up comprising 13.4 ml. of 90 percent hydrogen peroxide in 40 grams of glacial acetic acid. One-half of the hydrogen peroxide solution was slowly added to the oil solution while the temperature was kept below 30° C. The second half of the hydrogen peroxide solution was then added while the temperature was maintained at about 90–110° C. The resulting mixture was heated on a steam bath for about one-half hour and allowed to stand over night at room temperature. After standing over night the mixture was poured into a large volume excess of ice water and a white taffy-like sulfone polymer precipitated. The solution containing the precipitate was neutralized, the aqueous phase was poured off and the taffy-like material was washed with water and extracted with chloroform. After drying of the extracted material the chloroform was distilled yielding an 86 percent yield of taffy-like sulfone polymer. Chemical analysis of this polymer showed the presence of about 12.5 percent silicon, 13.1 percent sulfur, 45.2 percent carbon, and 5.4 percent hydrogen as compared with the theoretical values of 12.3 percent silicon, 14.0 percent sulfur, 47.4 percent carbon and 5.3 percent hydrogen. This sulfone-containing organopolysiloxane consisted essentially of the following recurring structural unit:

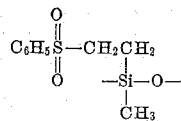

Infrared analysis was consistent with this structure and specifically showed the presence of the sulfone group.

Five grams of this sulfone-containing organopolysiloxane were added to a mixture of 50 milligrams of tetramethyl ammonium hydroxide in 75 ml. of octamethylcyclotetrasiloxane which had been stirred and heated to 110° C. The mixture was heated for additional time at 110° C. under nitrogen. During this time a portion of the octamethylcyclotetrasiloxane evaporated from the mixture. The final product was a light brown cross-linked gum containing about 10 mol percent of the sulfone units described above and 90 mol percent of dimethylsiloxane units. One hundred parts of this gum were compounded with 40 parts of silica aerogel (Santocel-C) and 2 parts of benzoyl peroxide. The compounded product was then press cured for 20 minutes at 120° C., yielding a stiff organopolysiloxane elastomer containing about 10 mol percent of the sulfone units described above.

Example 2

Equimolar amounts of dimethyldichlorosilane and 2-(methyldichlorosilyl)ethyl phenyl thioether were cohydrolyzed by addition to ice water with stirring. The resulting mixture was partially neutralized with 50 percent sodium hydroxide and finally neutralized with sodium bicarbonate resulting in an oily cohydrolysis product having a density similar to that of the aqueous phase. To separate the phases, sodium chloride was added, bringing the oil to the top. This oily phase was separated and dried to give an 89 percent yield of the cohydrolysis product of the thioether and the dimethyldichlorosilane.

A solution was formed of 51 grams of the oily cohydrolysis product in 41 grams of glacial acetic acid. A second solution was formed of 12.1 ml. of 90 percent hydrogen peroxide in 50 ml. of glacial acetic acid. One-half of the hydrogen peroxide solution was slowly added with stirring to the cohydrolysis product while the temperature was maintained at from 5–30° C. The rest of the hydrogen peroxide solution was then added with mixing while the mixture was maintained at a temperature of about 90–110° C. for about one hour. After standing over night the resulting solution was poured into ice water to precipitate a dense oil. The solution containing the precipitated oil was partially neutralized with 50 percent aqueous sodium hydroxide and finally neutralized with 5 percent sodium bicarbonate. The mixture was washed several times with water to remove dissolved salts and the oil was then dissolved in chloroform. The resulting solution was then rewashed with water and finally dried over calcium sulfate, after which the chloroform was removed by distillation to produce a pure sulfone-containing silicone oil. Chemical analysis of this oil showed the presence of 19 percent silicon, 9.6 percent sulfur, 43.4 percent carbon and 6.5 percent hydrogen as compared with the theoretical values of 18.5 percent silicon, 10.6 percent sulfur, 43.7 percent carbon and 6.0 percent hydrogen. Infrared analysis of the oil was consistent with the foregoing structure and particularly showed the presence of the sulfone groups.

About 6 grams of the oil described above was mixed with 50 mg. of tetramethyl ammonium hydroxide and heated at 110° C. for about an hour under nitrogen. This resulted in a light brown silicone gum consisiting essentially of equal numbers of each of the following recurring structural units:

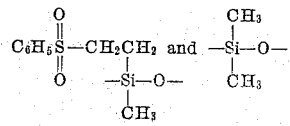

This gum is converted to an elastomer by mixing 100 parts of the gum with 50 parts of silica aerogel and 2 parts of benzoyl peroxide and press cured for 20 minutes at 120° C. to form an elastomeric material which is resistant to hydrocarbon solvents.

*Example 3*

Six grams of the sulfone-containing silicone oil of Example 2 were mixed with 50 mg. of rubidium hydroxide and partially polymerized at a temperature of 100° C. under nitrogen. Six grams of octamethylcyclotetrasiloxane were then added to the mixture and with an addition 50 mg. of tetramethyl ammonium hydroxide. The resulting solution was heated at 110° C. to yield a light brown gum. A nitrogen stream, which was used during the polymerization caused evaporation of a portion of the octamethylcyclotetrasiloxane so that the resulting gum contained about 30 mol percent of the sulfone-containing siloxane units described in Example 2 and 70 mol percent of dimethylsiloxane units. One hundred parts of this gum were mixed with 50 parts of silica aerogel and 2.5 parts of benzoyl peroxide and the mixture was compounded and cold pressed into a sheet. This sheet was subsequently heated at 150° C. for 2 hours to give a cured, brown rubbery material which still contained the 30 mol percent of the sulfone-containing siloxane units. After soaking this sheet in toluene for 24 hours at room temperature, e.g., about 20° C., it exhibited a volume increase of about 51 percent. This compares with the minimum volume increase of about 190 percent found with conventional dimethyl silicone elastomers.

*Example 4*

Equimolar amounts of methyl mercaptan and methylvinyldiethoxysilane were mixed and subjected to ultraviolet irradiation for a period of about 3 hours, during which time the temperature of the reaction mixture rose from room temperature to about 75° C. At the end of this time the reaction mixture was fractionally distilled to give 95.5 percent yield of 2(methyldiethoxysilyl)ethyl methyl thioether having the formula

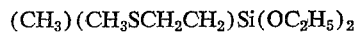

(CH₃)(CH₃SCH₂CH₂)Si(OC₂H₅)₂

This material had a boiling point of 127.5 to 129° C. at 59 mm., a refraction index $n_D^{20}$ of 1.4454, and a density $D_4^{20}$ of 0.954.

Equimolar amounts of the thioether described above and dimethyldichlorosilane were cohydrolyzed by adding to a stirred ice water solution. After standing for about 1 hour the mixture was heated and stirred at about 50–75° C. for ½ hour to complete the hydrolysis. This resulted in an aqueous phase and an oil phase which was removed, neutralized with sodium carbonate, washed with water, and dried over anhydrous potassium carbonate giving a yield of 93 percent of a clear, colorless oil.

A mixture was formed of 137 grams of this oil in 100 grams of glacial acetic acid. A second solution was prepared of 55.8 ml. of 90 percent hydrogen peroxide and 150 ml. of glacial acetic acid. One-half of the hydrogen peroxide solution was added to the oil solution with cooling to form an intermediate oxidation product. The rest of the hydrogen peroxide solution was then added while the solution was kept at a temperature of from 90 to 110° C. The mixture was stirred for an additional hour at 110° C. and allowed to stand at room temperature for 2½ hours. This mixture was added to an excess of water to form a two-phase solution, the lower phase being the sulfone-containing organopolysiloxane. This organopolysiloxane was then cleaned in the usual manner except that a minor proportion of basic material remained. On subsequent heating of the sulfone-containing organopolysiloxane, solidification resulted and a white gum was formed. In addition to the water insoluble sulfone-containing organopolysiloxane just described it was also found that a water soluble sulfone-containing organopolysiloxane was formed. This water soluble product was separated from the water by evaporation from the water, extraction with chloroform and drying over calcium sulfate with subsequent evaporation of the chloroform. The total yield of both the water insoluble and the water soluble sulfone-containing organopolysiloxane was 87 percent. Both the water soluble and the water insoluble sulfone-containing organopolysiloxanes consisted essentially of equal numbers of each of the following recurring structural units:

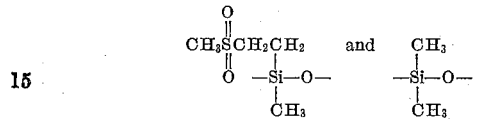

$$\underset{\underset{CH_3}{|}}{\overset{\overset{O}{\underset{\|}{CH_3SCH_2CH_2}}}{\underset{\|}{-Si-O-}}} \quad \text{and} \quad \underset{\underset{CH_3}{|}}{\overset{CH_3}{\underset{|}{-Si-O-}}}$$

*Example 5*

The water insoluble sulfone-containing gum of Example 4 was compounded by mixing 20 grams of the gum with 6 grams of silica aerogel and 0.1 gram of benzoyl peroxide. The compounded product was press cured for 20 minutes at 120° C. in a closed mold. This resulted in a cross-linked rubber which had a tensile strength of about 400 p.s.i. and about 70 percent elongation.

*Example 6*

The gum described in Example 5 was compounded by mixing 25 grams of the gum with 7.5 grams of silica aerogel without the addition of any peroxide. After press curing at 120° C. this material had a tensile strength and elongation similar to that of the rubber of Example 5.

*Example 7*

Another portion of the gum described in Example 5 was compounded by mixing 20 grams of gum with 8 grams of a high surface alumina (Alon-C) and 0.4 gram of benzoyl peroxide. After press curing for 20 minutes at 120° C. the resulting rubber had a fairly high tensile strength.

*Example 8*

Another sulfone-containing silicone rubber was prepared by mixing 10 grams of the gum described in Example 5 with 4 grams of diatomaceous earth (Celite-270) and 0.2 gram of benzoyl peroxide. This mixture was cured at 120° C.

*Example 9*

Another sulfone-containing rubber was formed by compounding 10 grams of the gum described in Example 5 with 40 grams of silica aerogel and 0.20 gram of benzoyl peroxide. This compounded product was cured by heating for 20 minutes at 120° C.

*Example 10*

Another sulfone-containing silicone rubber was prepared by compounding 20 grams of the gum described in Example 5 with 8 grams of silica aerogel (Santocel-C) and 0.2 gram of benzoyl peroxide. This compounded product was press cured for 20 minutes at 120° C. and heat aged in an air oven for 18 hours at 200° C. At the end of this time the resulting rubber had a tensile strength of about 350 p.s.i. and an elongation of about 70 percent. In equilibrium swelling tests (after 33 hours) this rubber exhibited a volume increase of 15 percent in a 70–30 mixture of isooctane and toluene and exhibited a 23 percent volume increase in pure toluene. This compares with the minimum percent volume increase of about 180–200 percent which is conventionally found in these solvents with methyl silicone rubbers. This rubber exhibited excellent thermal stability as indicated by the fact that sheets of this rubber exhibited a weight loss of only about 2.6 percent after 112 hours at 200° C. At the end of this time the material had not changed color, was still odorless, and retained its flexibility.

Example 11

The water soluble portion of the sulfone-containing organopolysiloxane fluid of Example 4 was polymerized by mixing 10 grams of this fluid with 0.03 gram rubidium hydroxide and heating the mixture for about 10 minutes at 100° C. under a nitrogen atmosphere. This resulted in a gum which was soluble in chloroform and did not exhibit any cross-linking. This gum was compounded by mixing 8 grams of the gum with 3.2 grams of silica aerogel (Santocel-C) and 0.16 gram benzoyl peroxide. The material was press cured for 20 minutes at 120° C. and then further aged for 2 hours at 150° C. in an air oven. The product was a flexible rubbery sheet with properties similar to those described in the rubber of Examples 5 through 10.

As previously mentioned, the sulfone-containing silicone rubbers of the present invention are particularly useful in applications where both resistance to high temperature and resistance to the action of non-polar solvents is required. And in particular, the sulfone-containing organopolysiloxane rubber of the present invention is useful as a gasket material in aircraft fuel lines where the gasket must come in contact with aviation gasoline. In addition, however, it should be understood that the sulfone-containing organopolysiloxane rubber of the present invention has the same utility as conventional silicone rubbers in that it is useful in the encapsulation of electrical apparatus, for shock absorbing applications, as insulation on electrical conductors, and for most other applications where conventional hydrocarbon elastomers may be employed.

What I claim as new and desire to secure by Letters Patent of the United States is:

1. A composition convertible to the solid, cured elastic state comprising an organopolysiloxane in which at least some of the organo groups are silicon-bonded

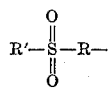

radicals, where R is an alkylene radical containing at least two carbon atoms with the sulfur atom being separated from the silicon atom by at least two carbon atoms and R' is a member selected from the class consisting of alkyl and aryl radicals, any remaining organo groups being selected from the class consisting of monovalent hydrocarbon radicals and halogenated hydrocarbon radicals.

2. The cured product of claim 1 obtained by heating the composition of claim 1 in combination with a filler and a peroxide curing catalyst for the organopolysiloxane.

3. A composition convertible to the solid, cured elastic state comprising an organopolysiloxane having the average formula

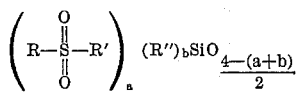

where $a$ has a value of from 0.1 to 2.0, inclusive, and the sum of $a+b$ is from 1.9 to 2.1, inclusive, R is an alkylene radical containing at least two carbon atoms with the sulfur atom being separated from the silicon atom by at least two carbon atoms, R' is a member selected from the class consisting of alkyl and aryl radicals, and R" is a member selected from the class consisting of monovalent hydrocarbon radicals and halogenated monovalent hydrocarbon radicals.

4. The cured product of claim 3 obtained by heating the composition of claim 3 in combination with a filler and a peroxide curing catalyst for the organopolysiloxane.

5. A composition convertible to the cured, solid elastic state comprising the recurring structural unit

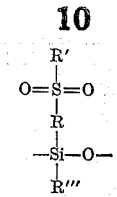

where R is an alkylene radical having at least two carbon atoms with the sulfur atom being separated from the silicon atom by at least two carbon atoms and R' and R" represent members selected from the class consisting of alkyl and aryl radicals.

6. The cured product of claim 5 obtained by heating the composition of claim 5 in combination with a filler and a peroxide curing catalyst for the composition.

7. A composition convertible to the cured, solid elastic state comprising the recurring structural unit

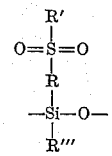

intercondensed with the recurring structural unit

where R represents an alkylene radical having at least two carbon atoms with the sulfur atom being separated from the silicon atom by at least two carbon atoms, R' and R''' represent members selected from the class consisting of alkyl and aryl radicals, and R" is a member selected from the class consisting of monovalent hydrocarbon radicals and halogenated monovalent hydrocarbon radicals.

8. The cured product of claim 7 obtained by heating the composition of claim 7 in combination with a filler and a peroxide curing catalyst for the composition.

9. A composition convertible to the cured, solid elastic state consisting essentially of (A) an organopolysiloxane in which at least some of the organo groups are silicon-bonded

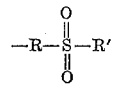

radicals, where R is an alkylene radical containing at least two carbon atoms with the sulfur atom being separated from the silicon atom by at least two carbon atoms, and R' is a member selected from the class consisting of alkyl and aryl radicals, any remaining organo groups in said organopolysiloxane being selected from the class consisting of monovalent hydrocarbon radicals and halogenated monovalent hydrocarbon radicals, (B) a filler and (C) a free radical peroxide curing catalyst for the organopolysiloxane.

10. The cured product of claim 9 obtained by heating the composition of claim 9.

11. A composition convertible to the cured, solid elastic state consisting essentially of both of the following recurring structural units:

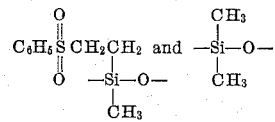

12. The cured product of claim 11 obtained by heating the composition of claim 11 in combination with a filler and a peroxide curing catalyst for the composition.

13. A composition convertible to the cured, solid elastic state consisting essentially of both of the following recurring structural units:

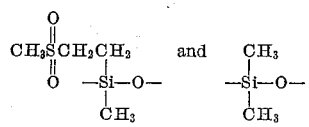

14. The cured product of claim 13 obtained by heating the composition of claim 13 in combination with a filler and a peroxide curing catalyst for the composition.

References Cited in the file of this patent

UNITED STATES PATENTS

| | | |
|---|---|---|
| 2,460,795 | Warrick | Feb. 1, 1949 |
| 2,719,165 | Cooper | Sept. 27, 1955 |
| 2,833,801 | Holbrook | May 6, 1958 |
| 2,835,690 | Prober | May 20, 1958 |